Oct. 5, 1954 M. F. CHUBB Re. 23,883

CUPROUS CHLORIDE ELECTRODE

Original Filed Jan. 3, 1951

INVENTOR.
MELVIN F. CHUBB,

BY Lawrence Glassman

Reissued Oct. 5, 1954 Re. 23,883

UNITED STATES PATENT OFFICE 23,883

CUPROUS CHLORIDE ELECTRODES

Melvin F. Chubb, Joplin, Mo., assignor to the United States of America as represented by the Secretary of the Army Original No. 2,658,935, dated November 10, 1953, Serial No. 204,134, January 3, 1951. Application for reissue March 12, 1954, Serial No. 415,997

10 Claims. (Cl. 136—100)

Matter enclosed in heavy brackets [ ] appears in the original patent but forms no part of this reissue specification; matter printed in italics indicates the additions made by reissue.

This invention relates to primary cells, of the deferred action type, using the electro-chemical system magnesium-water-cuprous chloride.

Magnesium-cuprous chloride batteries have attained considerable importance, particularly as "meterological" or "one-shot" batteries, due to their high capacity per unit of weight and volume, their excellent operating characteristics even at low temperature (linear potential and capacity), their ease of activation with water as electrolyte and their low cost of manufacture. Since neither acid nor alkaline electrolytes are used in these batteries, the danger of corrosion, caused particularly by acid fumes is completely eliminated.

In the past, cuprous chloride electrodes were made from fused cuprous chloride supported by a coil, plate, wire grid, or similar structural elements. Fused cuprous chloride involves a number of severe production difficulties, particularly in mass production, due to the necessity of maintaining the fused cuprous chloride at relatively high temperatures while charging the supporting structural element. In addition thereto the active area of a fused cuprous chloride electrode is limited substantially to the outer surface exposed to the electrolyte. These insufficiencies have been overcome by the development of a porous cuprous chloride electrode made from a pasty mixture comprising, essentially finely ground cuprous chloride and a liquid, substantially water. This mixture is pasted on the supporting structure or grid, e. g., a wire screen of copper, and the electrode is then dried at room or elevated temperature. The resulting porous cuprous chloride electrodes still present a number of practical difficulties. One of these difficulties consists in insufficient adhesion of the paste to the supporting grid, another lies in the great reactivity of cuprous chloride of high porosity. Insufficient adhesion results in electrodes of low physical strength having a tendency to deteriorate mechanically, while the high reactivity of porous cuprous chloride electrodes leads to overheating of the cells, particularly in case of high voltage batteries and prolonged discharge periods.

It is an object of this invention to overcome these and other disadvantages by using a cuprous chloride paste containing one or more substances which materially improve adhesion of the cuprous chloride paste to the supporting structure and at the same time diminish the high reactivity of the porous cuprous chloride thereby eliminating the danger of overheating.

Briefly stated, the above mentioned and other objects are attained by using for the production of porous cuprous chloride electrodes, a cuprous chloride paste containing finely ground cuprous chloride [, water] and a solution of a high polymer of relatively high dielectric constant, as for instance polystyrene, in a suitable organic solvent, with or without the addition of a suitable plasticizer for said high polymer.

Other objects of the invention will become apparent from the following description and accompanying drawing of a specific embodiment of the broad inventive idea.

Figure 1:
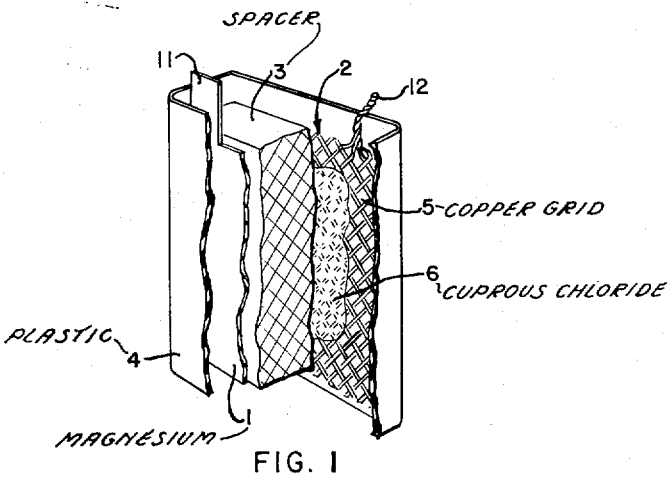
Fig. 1 is a perspective view of a single cell using a cuprous chloride electrode made according to the invention; the cell is partly cut away to show the internal elements and their construction.

The single cell of Fig. 1 comprises a positive magnesium electrode 1 and a negative cuprous chloride electrode 2. A spacer 3 consisting in conventional manner, of any suitable, bibulous and ionically conductive material separates the magnesium electrode 1 from the cuprous chloride electrode 2. A hull 4 of insulating sheet material holds the elements of the electrode-spacer structure laterally together under pressure contact but leaves top and bottom of the electrode-spacer structure open.

The cuprous chloride electrodes are produced by first making a pasty mixture consisting of finely ground cuprous chloride *and* [, water,] polystyrene in a suitable solvent and an appropriate plasticizer for the polystyrene.

The cuprous chloride is used in the form of a fine powder or flour, less than 200 mesh particle size. This is admixed in the proportion of approximately 162 parts of cuprous chloride to 57 parts by weight of polystyrene solution, the solution being made up of approximately 209 parts of polystyrene, to 375 parts of toluene, 27 parts of benzene, 25 parts of a plasticizer known under the trade name "Aroclor #5460," and about 10 parts of a wetting agent, e. g., "Aerosol (OT)."

Without the addition of a plasticizer the above mixture of cuprous chloride powder and polystyrene is too brittle when dry, and plates made up of such mixtures are subject to damage thru cracking off of the paste in the handling incidental to normal production. However, this difficulty is overcome by imparting flexibility to the mixture by the addition of any of a number of suitable polystyrene plasticizers, as for example, the above mentioned Aroclor #5460. The presence of a wetting agent, as for instance Aerosol, in the finished electrodes facilitates the absorption of electrolyte.

The above described, or any similarly produced mixture, is then pasted on a supporting grid 5, which may consist of a wire screen of copper, bronze, lead, stainless steel or any other suitable conductive support of a material which does not appreciably affect the characteristics of the system. Fig. 1 shows a partially finished cuprous chloride electrode consisting of the supporting wire screen 5 with the cuprous chloride pasted only in the center of the screen. Very thin cuprous chloride electrodes may be produced by using, for instance, a 45/45 mesh copper screen of about .015'' thickness.

To improve the conductivity of the cuprous chloride, various inert conductive materials may be added to the pasty mixture, such as carbon black or graphite. Particularly suitable are the substances known under the trade name of "Dixon Graphite" and "Shawinigan Black." Such materials are preferably added in amounts of about 1 to 2% of the cuprous chloride.

The cuprous chloride paste may be charged into the supporting grid or screen from one or both sides. If charged from one side only the screen weave may be visible from one side of the unit, while the other side appears as a continuous surface paste. The paste is applied by means of a trowel or spatula. After pasting the finished plate may be air dried at room temperature or dried at elevated temperature, for instance, at 100° C. for approximately two hours.

The magnesium electrode 1 is preferably of about .006''–0.014'' in thickness. Either pure magnesium or some alloy may be used and neither should contain more than about 1% of impurities.

Spacer 3 may consist of paper, wood pulp, microporous rubber, glass-wool, rayon (viscose) felt, or other liquid retaining materials, inert to the action of the substances produced during the electro-chemical actions of the cell. The thickness of the spacer 3 is designed to soak up enough electrolyte (not shown) to allow complete utilization of the active materials of the electrodes 1 and 2.

The electrodes 1 and 2 are provided with respective terminals 11 and 12. The terminal 12 of the cuprous chloride electrode 2 may consist of one or more screen wires extending from the electrode area and twisted into a single terminal.

The cell may be simply assembled by arranging the negative and positive electrodes 1 and 2 at opposite sides of the separator 3 and then winding insulating sheet material peripherally around the electrode-spacer structure so as to obtain a hull 4 which leaves top and bottom of the electrode spacer structure open. The insulated sheet material of the hull 4 may consist of polystyrene sheet material, pressure sensitive cellulosic tape (for instance, Scotch tape), or sheets from various other polyvinyl resins, or the like.

The assembled cell is activated by immersing the same in water which may contain small amounts of hydrochloric acid or sodium chloride or other ionizable substances which tend to favorably alter the operating characteristics of the battery. The addition of sodium chloride or other suitable chlorides to the electrolyte results in a somewhat greater cell voltage and also brings the voltage up more rapidly, than water alone.

It is usually sufficient to keep the cell immersed in the electrolyte for about one half to one minute depending on the size of the cell and the porosity of the spacer 3. Usually, it is sufficient to immerse ("dunk") only half of the height of the cell into the liquid electrolyte. After the spacer 3 has absorbed sufficient electrolyte, the cell is withdrawn, shaken to remove excess electrolyte and is then ready for use.

Figure 2:
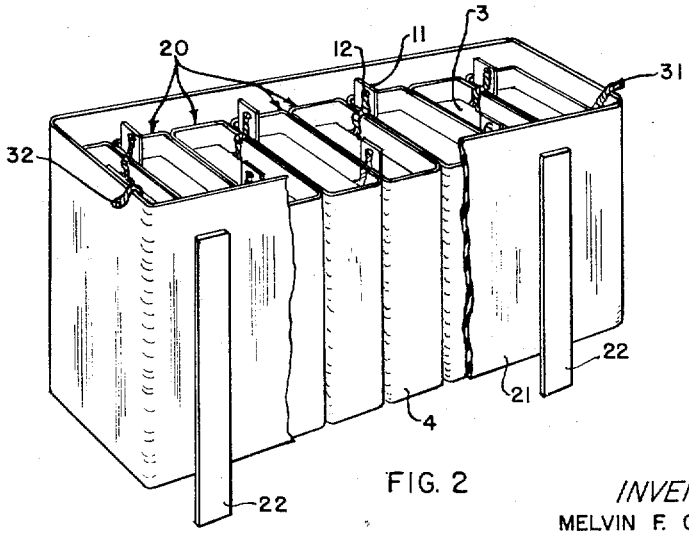
Fig. 2 is a perspective view of a meteorological battery made up of a plurality of such cells, the outer wrapping of the battery being partly broken away.

Fig. 2 shows a meteorological "dunk" type battery consisting of a plurality of cells of the type shown in Fig. 1. An outer wrapping 21 (consisting of the same materials as the hull 4) holds the cells 20 together under pressure contact, leaving the tops and bottoms of the cells free for the entrance of the electrolyte which is soaked up by the spacers 3 of the cells 20. The electrode terminals 11 and 12 of each cell stand up at the top, and the cells 20 are connected in series, in well known manner, by soldering or welding together the positive terminals 11 of each cell to the negative terminal 12 of each adjacent cell, leaving the positive terminal 32 of one end cell and the negative terminal 31 of the other end cell free for their use as battery terminals.

Supporting strips 22, which extend below the outer wrapper 21, serve as legs to hold the battery in a raised position.

While I have described my invention in connection with the design of a deferred action type battery, I do not wish to be limited either to the particular design or to the specific combination of internal elements referred to herein, since it is evident that the cuprous chloride electrode according to my invention may be used in various other battery designs, particularly in pile-type constructions, and also in combination with other elements in other electro-chemical systems.

I claim:

1. Method of making electrodes of porous cuprous chloride for primary cells comprising making a pasty mixture of finely ground cuprous chloride [,water,] and a solution of a highly polymeric substance of high dielectric constant in an organic solvent, pasting said mixture onto a supporting grid and submitting said pasted grid to a drying operation *to remove the said organic solvent.*

2. Method of making electrodes of porous cuprous chloride for primary cells comprising making a pasty mixture of finely ground cuprous chloride [,water,] and a solution of polystyrene in an organic solvent, pasting such mixture onto a supporting grid and submitting said pasted grid to a drying operation *to remove the said organic solvent.*

3. Method of making electrodes according to claim 2 characterized in that a plasticizer for polystyrene is added to said pasty mixture.

4. Method of making electrodes according to claim 2 characterized in that a wetting agent is added to said pasty mixture.

5. A method of making electrodes according to claim 2 characterized in that said polystyrene is used in amounts sufficient to insure adhesion of the porous cuprous chloride to the supporting grid after the drying operation.

6. A porous cuprous chloride electrode for primary cells comprising a grid supporting a porous spongy mass of cuprous chloride, said mass containing a high polymer of high dielectric constant in amounts sufficient to insure the adhesion of the cuprous chloride to the supporting grid.

7. An electrode according to claim 6 wherein the high polymer consists of polystyrene.

8. An electrode according to claim 6 wherein said porous mass of cuprous chloride contains polystyrene and a plasticizer for polystyrene.

9. An electrode according to claim 6 wherein said porous mass of cuprous chloride contains a wetting agent.

10. A deferred action primary cell having flat internal elements arranged in close proximity to one another, said elements comprising a magnesium electrode, a spacer of bibulous ionically conducting material and a cuprous chloride electrode, said cuprous chloride electrode comprising a grid supporting a porous spongy mass of cuprous chloride, polystyrene, a plasticizer for polystyrene and a wetting agent.

References Cited in the file of this patent or the original patent

UNITED STATES PATENTS

| Number | Name | Date |
|---|---|---|
| 1,486,172 | Wilhelm | Mar. 11, 1924 |
| 2,050,172 | Gordon | Aug. 4, 1936 |
| 2,322,210 | Adams | June 22, 1943 |
| 2,428,850 | Lawson | Oct. 14, 1947 |
| 2,441,896 | Moir | May 18, 1948 |
| 2,579,743 | Kurlandsky | Dec. 25, 1951 |